(12) United States Patent
Suh et al.

(10) Patent No.: US 7,719,628 B2
(45) Date of Patent: May 18, 2010

(54) BACKLIGHT ASSEMBLY AND DISPLAY APPARATUS HAVING THE SAME

(75) Inventors: Chung-Woo Suh, Gwacheon-si (KR);
Young-Bee Chu, Suwon-si (KR); Ik-Soo Lee, Seoul (KR); Ji-Hwan Jang, Seoul (KR); Seung-Gyun Woo, Gyeongsangnam-do (KR)

(73) Assignee: Samsung Electronics Co., Ltd. (KR)

( * ) Notice: Subject to any disclaimer, the term of this patent is extended or adjusted under 35 U.S.C. 154(b) by 218 days.

(21) Appl. No.: 11/874,244

(22) Filed: Oct. 18, 2007

(65) Prior Publication Data
US 2008/0094535 A1    Apr. 24, 2008

(30) Foreign Application Priority Data
Oct. 18, 2006    (KR) .................. 10-2006-0101125

(51) Int. Cl.
*G02F 1/1333*    (2006.01)
(52) U.S. Cl. ..................... 349/58; 349/122; 349/64; 349/65; 362/633
(58) Field of Classification Search ............... 349/65, 349/62, 57, 64, 122, 58; 362/633, 620, 634, 362/632
See application file for complete search history.

(56) References Cited

U.S. PATENT DOCUMENTS

| | | | |
|---|---|---|---|
| 6,175,396 B1 * | 1/2001 | Kim et al. ..................... | 349/58 |
| 6,411,353 B1 * | 6/2002 | Yarita et al. ................... | 349/59 |
| 6,667,780 B2 * | 12/2003 | Cho ............................ | 349/58 |
| 6,835,961 B2 * | 12/2004 | Fukayama ................... | 257/84 |
| 6,950,154 B2 * | 9/2005 | Lee ............................. | 349/58 |
| 7,490,973 B2 * | 2/2009 | Fujikawa et al. ............ | 362/634 |

FOREIGN PATENT DOCUMENTS

KR    19990005190    1/1999

\* cited by examiner

*Primary Examiner*—Thoi V Duong
(74) *Attorney, Agent, or Firm*—Cantor Colburn LLP

(57) ABSTRACT

A backlight assembly includes a light providing unit, an optical sheet, and a mold frame. The light providing unit generates light. The optical sheet has a main body disposed on the light providing unit and a sheet-guiding portion protruding outward from the main body. The mold frame has a frame shape to receive the light providing unit and the optical sheet and includes a sheet-guiding recess and a securing protrusion adjacent to at least one side of the sheet-guiding recess and protruding with respect to an upper surface of the optical sheet to prevent misalignment of the optical sheet. The sheet-guiding recess receives the sheet-guiding portion.

17 Claims, 11 Drawing Sheets

BACKLIGHT ASSEMBLY AND DISPLAY APPARATUS HAVING THE SAME

This application claims priority under 35 USC §119 to Korean Patent Application No. 2006-101125, filed on Oct. 18, 2006, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly and a display apparatus having the backlight assembly. More particularly, the present invention relates to a backlight assembly capable of improving a display quality and a display apparatus having the backlight assembly.

2. Description of the Related Art

A liquid crystal display ("LCD") apparatus includes an LCD panel displaying an image using light-transmittance of a liquid crystal and a backlight assembly disposed under the LCD panel to provide the LCD panel with light.

The backlight assembly includes a light source generating light, a light-guiding plate to guide the light upward, an optical sheet disposed on the light-guiding plate to improve optical properties of the light, and a mold frame for preventing the light source, the light-guiding plate, and the optical sheet from moving. The LCD panel is disposed on the mold frame and is secured at the mold frame by an adhesive tape.

Since the optical sheet is thin and is light in weight, misalignment between the optical sheet and the light-guiding plate and/or between the optical sheet and the LCD panel may occur.

When misalignment between the optical sheet and the light-guiding plate and/or between the optical sheet and the LCD panel occurs, the optical sheet is deformed due to heat and moisture, thereby resulting in a deterioration of the display quality of the LCD apparatus.

BRIEF SUMMARY OF THE INVENTION

The present invention provides a backlight assembly capable of preventing an optical sheet from being deformed and/or misaligned to improve a display quality.

The present invention also provides a display apparatus having the above-mentioned backlight assembly.

In one aspect of the present invention, a backlight assembly includes a light providing unit, an optical sheet and a mold frame. The backlight assembly may further include a sheet tape.

The light providing unit generates light. The optical sheet has a main body disposed on the light providing unit and a sheet-guiding portion protruding outward from the main body in a horizontal direction. The mold frame has a frame shape to receive the light providing unit and the optical sheet and includes a sheet-guiding recess and a securing protrusion adjacent to at least one end of the sheet-guiding recess to prevent misalignment of the optical sheet. The sheet-guiding recess receives the sheet-guiding portion. The securing protrusion may be formed adjacent to opposing ends of the sheet-guiding recess.

The mold frame may include a guiding mold and a side mold. The guiding mold receives the light providing unit and the optical sheet and has the sheet-guiding recess and the securing protrusion. The side mold is extended upward from an edge of the guiding mold.

The sheet tape may be disposed on the optical sheet and the guiding mold and is overlapping a portion of the optical sheet and a portion of the guiding mold to secure the optical sheet to the guiding mold. The sheet tape may include a tape-guiding recess to expose the securing protrusion, In another aspect of the present invention, a backlight assembly includes a light providing unit, an optical sheet and a mold frame.

The light providing unit generates light. The optical sheet has a main body and a sheet-guiding portion. The main body is disposed on the light providing unit and has a substantially rectangular shape. The sheet-guiding portion protrudes outward from at least one of four sides of the main body in a horizontal direction. The mold frame may have a frame shape to receive the light providing unit and the optical sheet and includes a sheet-guiding recess and a securing protrusion adjacent to at least one end of the sheet-guiding recess and protruding with respect to an upper surface of the optical sheet to prevent misalignment of the optical sheet. The sheet-guiding recess receives the sheet-guiding portion.

The mold frame may include a guiding mold and a side mold. The guiding mold receives the light providing unit and the optical sheet and has the sheet-guiding recess and the securing protrusion. The side mold is extended upward from an edge of the guiding mold.

In still another aspect of the present invention, a display apparatus includes a backlight assembly generating light and a display panel disposed on the backlight assembly to display an image.

The backlight assembly includes a light providing unit, an optical sheet and a mold frame. The light providing unit generates light. The optical sheet has a main body disposed on the light source unit and a sheet-guiding portion protruding outward from the main body. The mold frame has a frame shape to receive the light providing unit and the optical sheet and includes a sheet-guiding recess and a securing protrusion adjacent to at least one end of the sheet-guiding recess to prevent misalignment of the optical sheet. The sheet-guiding recess receives the sheet-guiding portion. The backlight assembly may further include a sheet tape disposed between the display panel and the mold frame to secure the display panel to the mold frame.

According to the above, a securing protrusion is formed adjacent to a sheet-guiding recess of a guiding mold to prevent misalignment of an optical sheet. Thus, a display quality of a display apparatus may be improved.

BRIEF DESCRIPTION OF THE DRAWINGS

The above and other aspects, features, and advantages of the present invention will become readily apparent by describing in further detail exemplary embodiments thereof with respect to the accompanying drawings, in which.

DETAILED DESCRIPTION OF THE INVENTION

Figure 1:
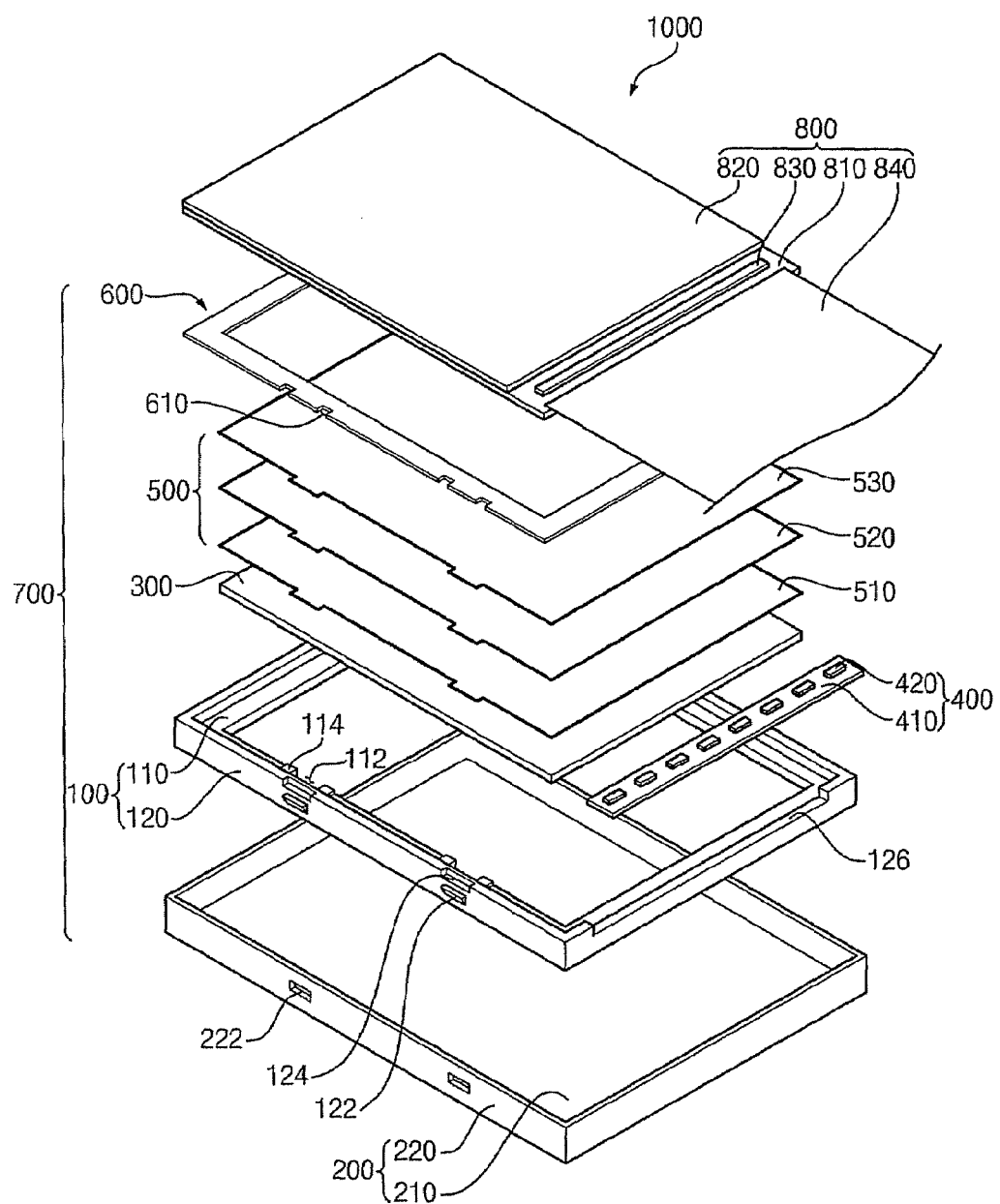
FIG. 1 is an exploded perspective view illustrating a display apparatus according to an exemplary embodiment of the present invention.

The invention now will be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

FIG. 1 is an exploded perspective view illustrating a display apparatus according to an exemplary embodiment of the present invention.

Referring to FIG. 1, an exemplary display apparatus 1000 includes a backlight assembly 700 generating light and a display panel 800 disposed on the backlight assembly 700 to display an image.

The backlight assembly 700 includes a mold frame 100, a bottom chassis 200, a light-guiding plate 300, a light-generating unit 400, an optical sheet 500 and a sheet tape 600.

The mold frame 100 has a frame shape to receive the light-guiding plate 300, the light-generating unit 400 and the optical sheet 500. Particularly, the mold frame 100 includes a guiding mold 110 and a side mold 120 extending upward from an edge of the guiding mold 110. The guiding mold 110 has a sheet-guiding recess 112 and a securing protrusion 114. A combining protrusion 122 and a separation guiding recess 124 are formed at an outer side surface of the side mold 120. The separation-guiding recess 124 may be disposed on the combining protrusion 122. The side mold 120 may have a guiding stepped portion 126.

The bottom chassis 200 is disposed under the mold frame 100 and receives the mold frame 100 to be combined with the mold frame 100. Particularly, the bottom chassis 200 has a bottom portion 210 facing a lower surface of the guiding mold 110 and a side portion 220 extending from an edge of the bottom portion 210 along the side mold 120.

A combining recess 222 is formed at the side portion 220 of the bottom chassis 200. The combining recess 222 is combined with the combining protrusion 122 of the side mold 120. The combining protrusion 122 of the side mold 120 is inserted into the combining recess 222 of the side portion 220 so that the mold frame 100 is combined with the bottom chassis 200. The separation-guiding recess 124 may be used for separating the mold frame 100 from the bottom chassis 200. For example, when a sharp instrument, such as a nail is inserted into the separation-guiding recess 124, and pressure is applied to the separation-guiding recess 124 through the nail, the mold frame 100 may be easily released from the bottom chassis 200.

The light-guiding plate 300 has a substantially plate-shape, and is received in the mold frame 100 and the bottom chassis 200. The light-guiding plate 300 is guided by the guiding mold 110 so that the light-guiding plate 200 is prevented from moving in a horizontal direction.

The light-generating unit 400 is received in the mold frame 100 and the bottom chassis 200 to face a side surface of the light-guiding plate 300. The light-generating unit 400 and the light-guiding plate 300 are collectively referred to herein as "light providing unit." The light-generating unit 400 generates light, and the light is incident onto the side surface of the light-guiding plate 300. The light is guided by the light-guiding plate 300, and then exits upward.

The light-generating unit 400 may include, for example, a driving substrate 410 and a light-emitting diode ("LED") 420 disposed on the driving substrate 410. The LED 420 is provided with power through the driving substrate 410 to generate light having a point-shape. A plurality of the LEDs 420 may be disposed on the driving substrate 410. The LEDs 420 may include a red-light LED, a green-light LED and a blue-light LED. Alternatively, the LEDs 420 may include a white-light LED.

A reflective sheet (not shown) may be disposed under the light-guiding plate 300. The reflective sheet reflects light exiting from the light-guiding plate 300 downward so that the light is incident onto the light-guiding plate 300. Alternatively, the bottom portion 210 of the bottom chassis 200 serves as the reflective sheet. For example, a reflective material may be coated on the bottom chassis 210 so that the bottom chassis 210 reflects light exiting from the light-guiding plate 300 downward.

The optical sheet 500 is disposed on the light-guiding plate 300, and is received in the mold frame 100 and the bottom chassis 200. The optical sheet 500 is guided by the guiding mold 110 so that the light-guiding plate 200 is prevented from moving in a horizontal direction.

The optical sheet 500 may improve optical properties of the light exiting upward from the light-guiding plate 300. For example, a plurality of optical sheets 500 may be deposited on the light-guiding plate 300. The optical sheets 500 may include a diffusing sheet 510, a first prism sheet 520 and a second prism sheet 530. The diffusing sheet 510 diffuses light to improve a brightness uniformity of the light. The first and second prism sheets 520 and 530 increase a brightness of the light in a forward direction. Alternatively, the first and second prism sheets 520 and 530 may be replaced by one integral prism sheet.

The sheet tape 600 is disposed on the optical sheet 500 and the mold frame 100. Particularly, the sheet tape 600 overlaps a portion of the optical sheet 500 and a portion of the mold frame 100 to secure the optical sheet 500 to the mold frame 100. The sheet tape 600 makes contact with an upper surface of the second prism sheet 530, or other top layer of the optical sheets 500, and with an upper surface of the guiding mold 110 of the mold frame 100 to secure the second prism sheet 530 to the guiding mold 110 of the mold frame 100. While the exemplary embodiments described herein refer to the tape sheet 600 in contact with the second prism sheet 530, it will be understood that any optical layer that is disposed above all other optical layers may be in contact with the sheet tape 600.

The sheet tape 600 may have, for example, a substantially rectangular frame shape when viewed from a plan view. A tape-guiding recess 610 may be formed at the sheet tape 600 to expose the securing protrusion 114 of the guiding mold 110.

The display panel 800 is disposed on the back light assembly 700 and displays an image using light provided by the backlight assembly 700. For example, the display panel 800 may include a first substrate 810, a second substrate 820, a liquid crystal layer (not shown), a driving chip 830 and a flexible printed circuit board ("PCB") 840.

The first substrate 810 may include a plurality of pixel electrodes (not shown) arranged in a matrix configuration, a plurality of thin-film transistors ("TFTs") (not shown) applying a driving voltage to the pixel electrodes and a plurality of signal lines (not shown) to operate the TFTs.

The second substrate 820 faces the first substrate 810. The second substrate 820 may include a common electrode (not shown) including a transparent conductive material and a plurality of color filters (not shown) facing the pixel electrodes. The color filters may include a red color filter, a green color filer and a blue color filter.

A liquid crystal layer is interposed between the first and second substrates 810 and 820, and is rearranged by an electric field formed between the pixel electrode and the common electrode to control a transmittance of the light exiting from the backlight assembly 700. The light passes through the color filters to display an image.

The driving chip 830 is disposed, for example, on the first substrate 810. The driving chip 830 is electrically connected to the signal lines of the first substrate 810 to control the TFTs for displaying an image.

The flexible PCB 840 overlaps a portion of the first substrate 810 and is electrically connected to the first substrate 810. The flexible PCB 840 generates a signal to control the driving chip 830. Furthermore, the display panel 800 may include an additional PCB (not shown) electrically connected to the flexible PCB 840.

The flexible PCB 840 may be combined with and guided by the guiding stepped portion 126 of the side mold 120.

Figure 2:
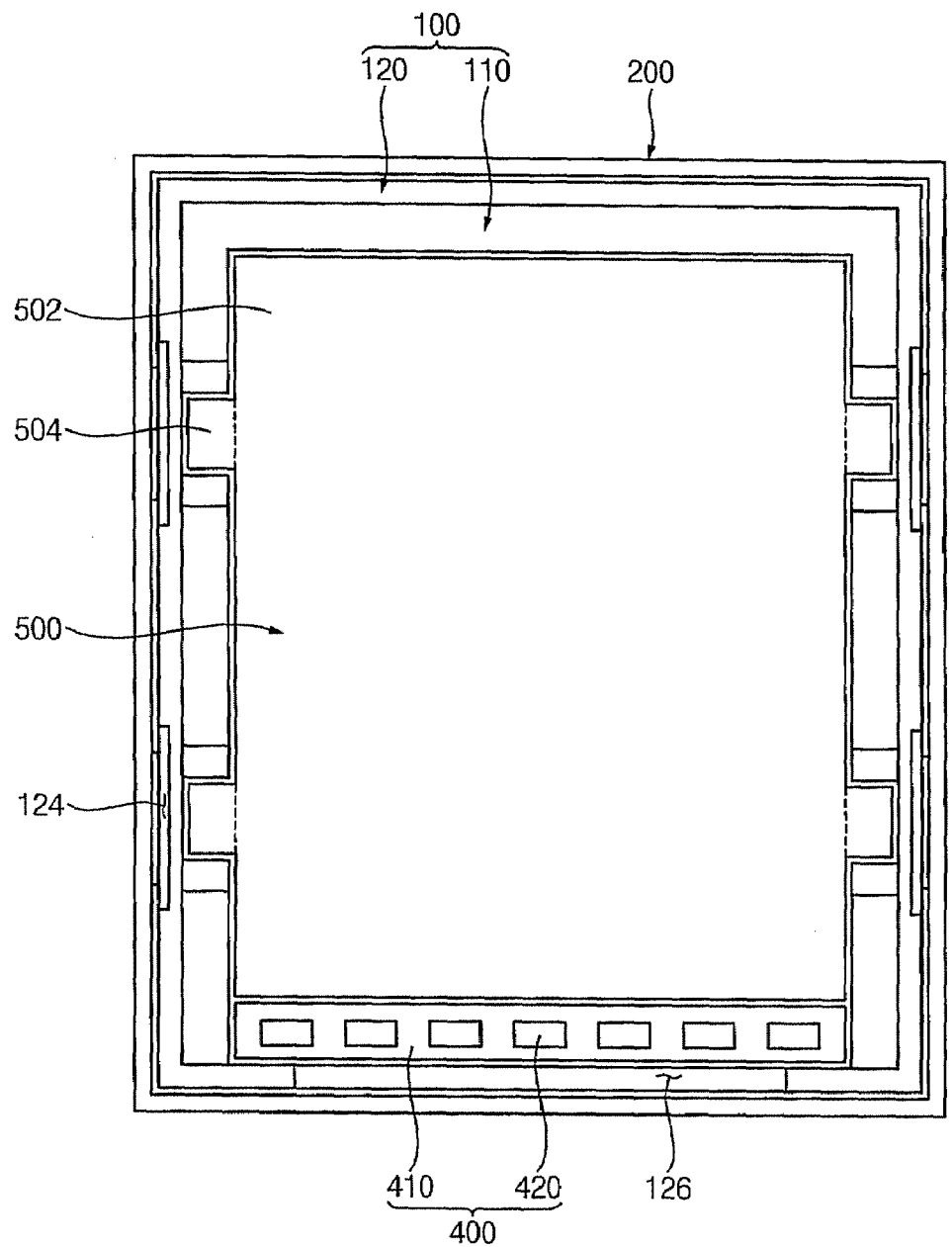
FIG. 2 is a plan view illustrating a backlight assembly of the display apparatus illustrated in FIG. 1.
Figure 3:
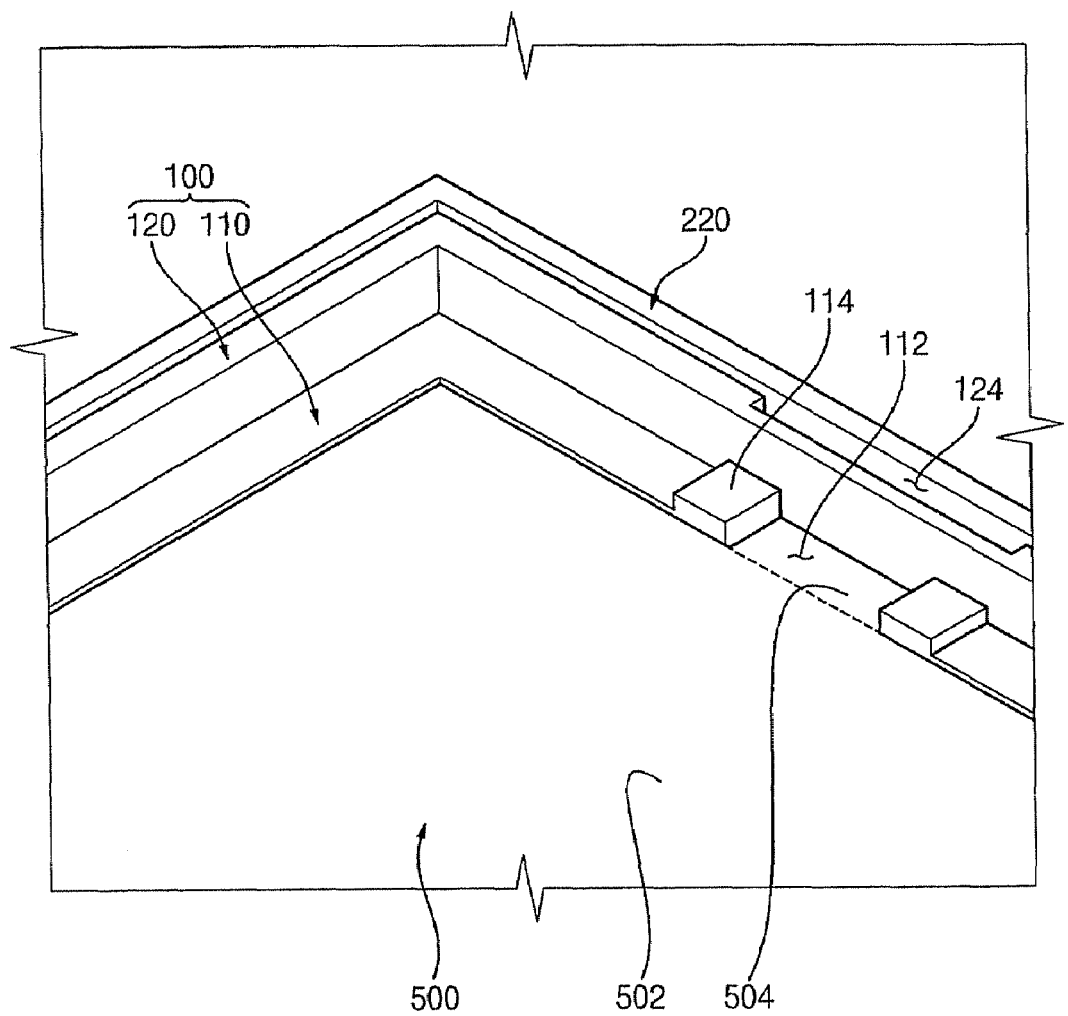
FIG. 3 is an enlarged perspective view illustrating a portion of the backlight assembly illustrated in FIG. 2.

FIG. 2 is a plan view illustrating a backlight assembly of the display apparatus illustrated in FIG. 1. FIG. 3 is an enlarged perspective view illustrating a portion of the backlight assembly illustrated in FIG. 2.

Referring to FIGS. 2 and 3, each optical sheet 500 has a main body 502 and a sheet-guiding portion 504.

The main body 502 is disposed on the light-guiding plate 300 and is guided by the guiding mold 110. The main body 502 may have a substantially rectangular shape when viewed from a plan view.

The sheet-guiding portion 504 protrudes outward from the main body 502. For example, a plurality of the sheet-guiding portions 504 may be formed on least one of four sides of the main body 502. The sheet-guiding portion 504 may protrude outward from the longer sides of the main body 502 in a horizontal direction and along a same plane as the longer sides. The sheet-guiding portion 504 may have a substantially rectangular shape when viewed from a plan view.

The sheet-guiding portions 504 may be arranged in a symmetric configuration with respect to the main body 502. As shown in FIG. 2, for example, four sheet-guiding portions 504 are arranged in a symmetric configuration. In particular, two of the sheet-guiding portions 504 may be formed on one of the longer sides of the main body 502, and the remaining two sheet-guiding portions 504 may be formed at the opposing side of the main body 502, as shown in FIG. 2, thereby providing a symmetric configuration.

The guiding mold 110 of the mold frame 100 receives the light-guiding plate 300, the light-generating unit 400, and the optical sheet 500. The side mold 120 extends upward from an edge of the guiding mold 110.

The placement of the sheet-guiding recess 112 on the guiding mold 110 corresponds to a placement of the sheet-guiding portion 504 on the optical sheet 500. Thus configured, the sheet-guiding recess 112 receives the sheet-guiding portion 504.

A pair of the securing protrusions 114 is formed adjacent to opposing ends of the sheet-guiding recess 112. The securing protrusions 114 secure the sheet-guiding portion 504 within the sheet-guiding recess 112, thereby preventing the sheet-guiding portion 504 from moving in a horizontal direction.

The separation-guiding recess 124 of the side mold 120 may be formed adjacent to the sheet-guiding recess 112.

Figure 4:
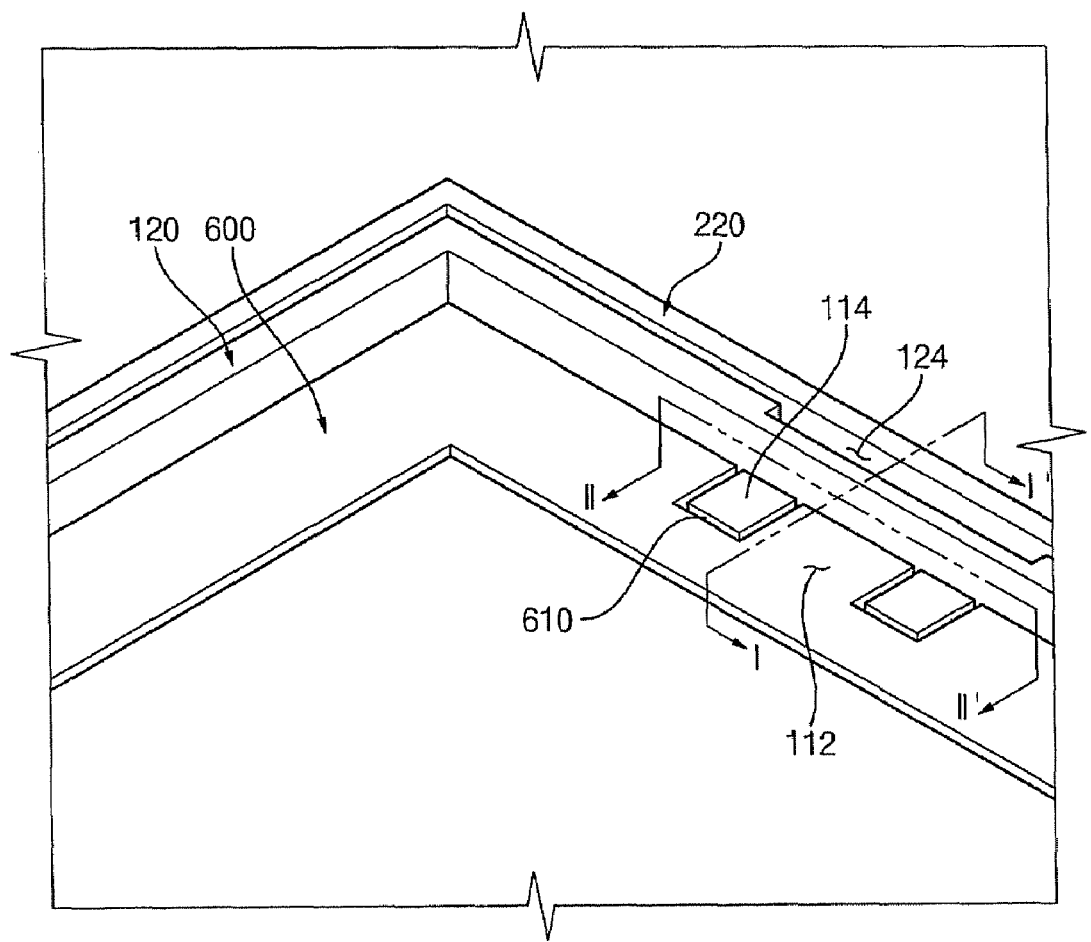
FIG. 4 is a perspective view illustrating the backlight assembly illustrated in FIG. 3, including a sheet tape.

FIG. 4 is a perspective view illustrating the backlight assembly shown in FIG. 3, and includes a sheet tape.

Referring to FIG. 4, the sheet tape 600 is disposed on the optical sheet 500 and the mold frame 100. The sheet tape 600 overlaps an outer portion of the optical sheet 500 and a portion of the mold frame 100 to secure the optical sheet 500 to the mold frame 100.

The sheet tape 600 may have a substantially rectangular frame shape when viewed from a plan view. The sheet tape 600 has the tape-guiding recess 610, which may be formed in a location on the sheet tape 600 corresponding to the location of a corresponding securing protrusion 114. The tape-guiding recess 610 receives the securing protrusion 114. An upper surface of the securing protrusion 114 is exposed through the tape-guiding recess 610.

Figure 5:
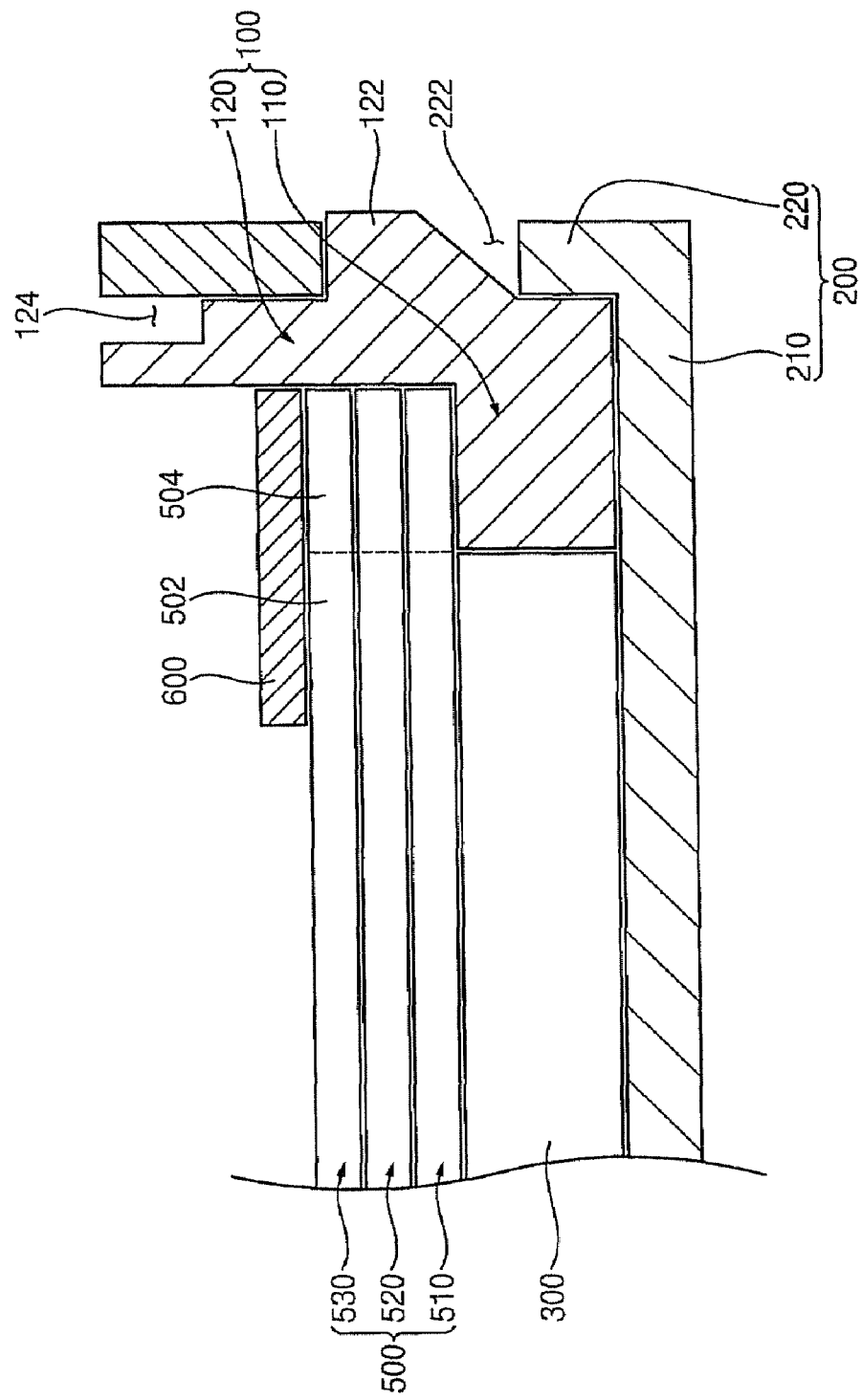
FIG. 5 is a cross-sectional view of the backlight assembly illustrated in FIG. 4, taken along a line I-I'.

FIG. 5 is a cross-sectional view of the backlight assembly of FIG. 4, taken along a line I-I'.

Referring to FIG. 5, a plurality of the optical sheets 500 is disposed on the light-guiding plate 300. For example, three optical sheets 500 including the diffusing sheet 510, the first prism sheet 520, and the second prism sheet 530 may be sequentially deposited on the light-guiding plate 300. A thickness of the diffusing sheet 510 may be about 56 μm to about 60 μm, a thickness of the first prism sheet 520 may be about 60 μm to about 64 μm, and a thickness of the second prism sheet 530 may be about 63 μm to about 67 μm.

Each of the optical sheets 500 has the main body 502 and the sheet-guiding portion 504. The main body 502 is disposed on the light-guiding plate 300. The sheet-guiding portion 504 is disposed on the guiding mold 110.

The sheet tape 600 makes contact with a portion of the main body 502 and the sheet-guiding portion 504 of the second prism sheet 530 or other top layer of the optical sheets 500.

The mold frame 100 includes the guiding mold 110 and the side mold 120. The bottom chassis 200 includes the bottom portion 210 and the side portion 220.

The combining protrusion 122 of the side mold 120 extends outward from a side surface of the side mold 120, e.g., in a substantially horizontal direction. A placement location of the combining recess 222, which is formed on the side portion 220 of the bottom chassis 200, corresponds to a placement location of the combining protrusion 122 on the mold frame 100, such that the combining recess 222 receives the combining protrusion 112 when the display apparatus 100 is assembled. The separation-guiding recess 124 may be formed at an upper portion of the side mold 120, which is adjacent to the combining protrusion 122.

As indicated above, the combining protrusion 122 is inserted into the combining recess 222 to combine the mold frame 100 with the bottom chassis 200. The mold frame 100 may be easily separated from the bottom chassis 200 when pressure is applied to the separation-guiding recess 124.

Figure 6:
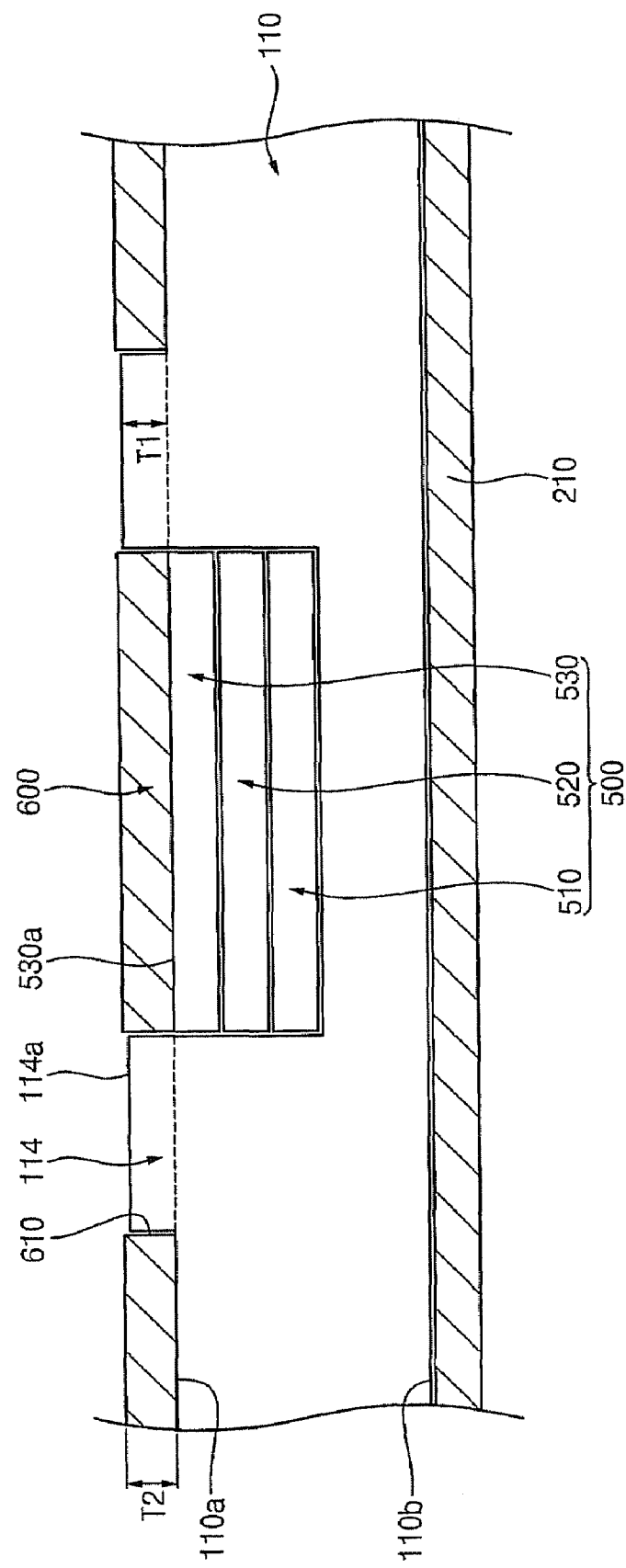
FIG. 6 is a cross-sectional view of the backlight assembly illustrated in FIG. 4, taken along a line II-II'.

FIG. 6 is a cross-sectional view of the backlight assembly of FIG. 4, taken along a line II-II'.

Referring to FIG. 6, the sheet-guiding portion 504 of the optical sheet 500 is received in the sheet-guiding recess 112 of the guiding mold 110. A pair of the securing protrusions 114 is formed adjacent to opposing ends of the sheet-guiding recess 112. The securing protrusions 114 protrude from an upper surface 110a of the guiding mold 110.

The sheet tape 600 is adhered at an upper surface 530a of the second prism sheet 530 or top layer of the optical sheets 500, and at the upper surface 110a of the guiding mold 110. The tape-guiding recess 610 receives the securing protrusions 114 to expose an upper surface 114a of the securing protrusions 114.

A distance between the upper surface 114a of the securing protrusion 114 and a lower surface 110b of the guiding mold 110 is greater than a distance between the upper surface 530a of the second prism sheet 530 and the lower surface 110b of the guiding mold 110. Thus configured, the securing protrusion 114 may prevent the second prism sheet 530 from moving in a horizontal direction.

A distance between the upper surface 530a of the second prism sheet 530 and the lower surface 110b of the guiding mold 110 may be substantially the same as a distance between the upper surface 110a of the guiding mold 110 the lower surface 110b of the guiding mold 110.

In an exemplary embodiment, a thickness T1 of the securing protrusion 114 may be less than or equal to a thickness T2 of the sheet tape 600. For example, when the thickness T2 of the sheet tape 600 is about 80 μm to about 100 μm, the thickness T1 of the securing protrusion 114 may be about 80 μm to about 100 μm.

When the display panel 800 is combined with the mold frame 100, pressure is applied to the sheet tape 600. Thus, the sheet tape 600 may become thin. Thus, when the thickness T2 of the sheet tape 600 is less than the thickness T1 of the securing protrusion 114, adherability between the display panel 800 and the sheet tape 600 may be reduced by the securing protrusion 114. Thus, the display panel 800 may be hindered from being secured to the mold frame 100.

Figure 7:
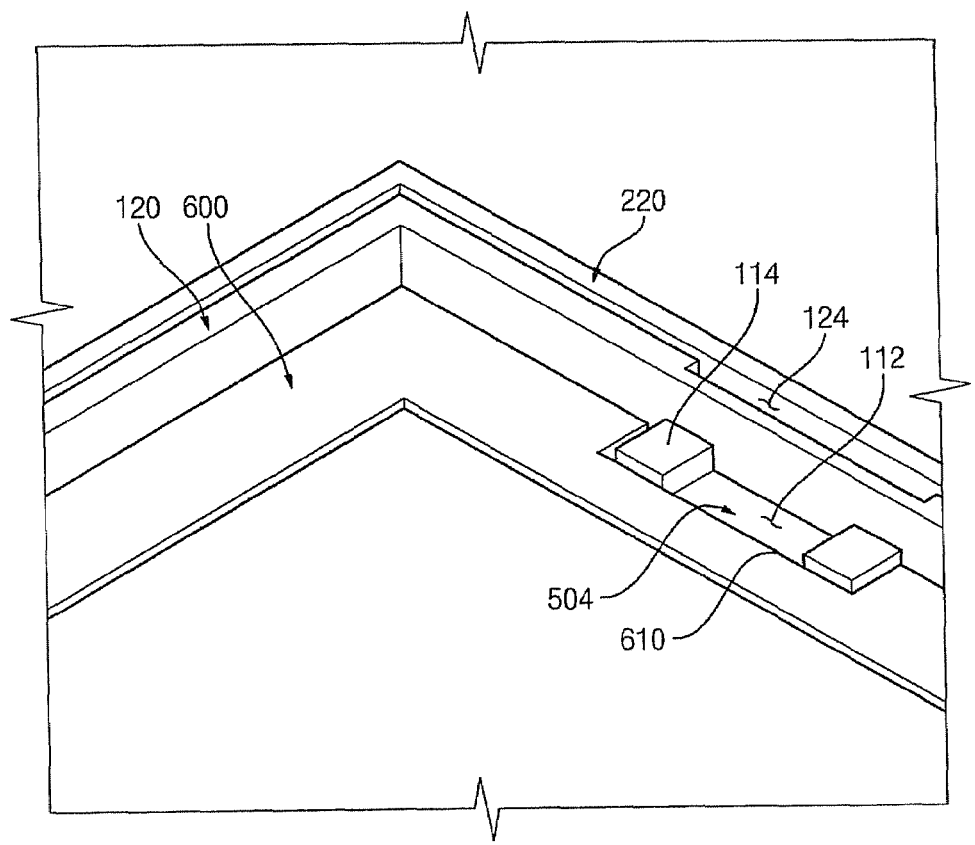
FIG. 7 is a perspective view illustrating a portion of a backlight assembly according to another exemplary embodiment of the present invention.

FIG. 7 is a perspective view illustrating a portion of a backlight assembly according to another exemplary embodiment of the present invention.

Referring to FIG. 7, a sheet tape 600 of the backlight assembly may have a shape different from the sheet tape illustrated in FIG. 4. The sheet tape 600 may have a substantially rectangular frame-shape when viewed from a plan view. The sheet tape 600 has a tape-guiding recess 610 overlapping the sheet-guiding recess 112 and the securing protrusion 114. Thus, an upper surface of the sheet-guiding portion 504 of the optical sheet 500 and an upper surface of the securing protrusion 114 may be exposed through the tape-guiding recess 610.

Figure 8:
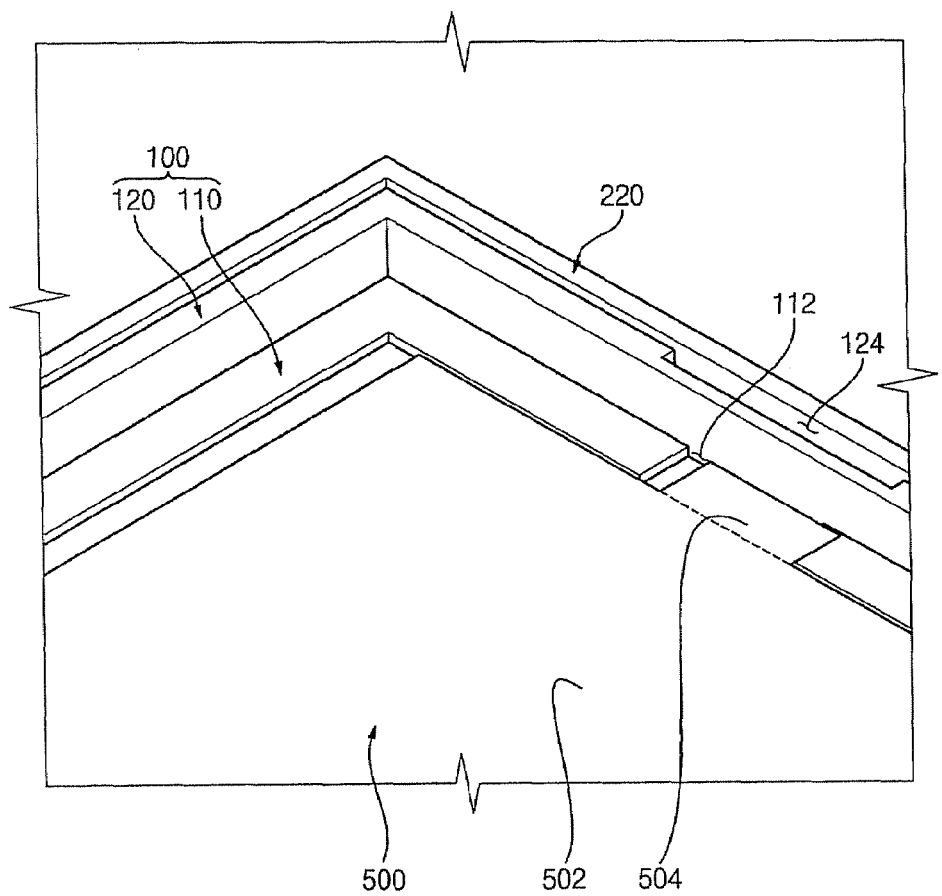
FIG. 8 is a perspective view of a backlight assembly illustrating a misaligned optical sheet.

FIG. 8 is a perspective view of a backlight assembly illustrating a misaligned optical sheet.

Hereinafter, effects of the backlight assembly according to an exemplary embodiment of the present invention will be explained with reference to FIGS. 3, 4, 5 and 8.

A guiding mold 110 of a mold frame 100 illustrated in FIG. 8 does not have the securing protrusion 114 illustrated in FIGS. 3 to 5. When the guiding mold 110 does not have the securing protrusion, the second prism sheet 530 or other top layer of the optical sheets 500 may be moved in a horizontal direction.

Since a height of an upper surface of a second prism sheet 530 is substantially the same as that of an upper surface of the guiding mold 110, the second prism sheet 530, a top layer of optical sheets 500, may be easily moved in a horizontal direction by an external pressure. For example, when an operator combines the sheet tape 600 with the optical sheets 500 received in the mold frame 100, the second prism sheet 530 may be easily moved by an external pressure such as static electricity. Thus, a misalignment may be caused.

When the misaligned second prism sheet 530 is secured at the guiding mold 110 of the mold frame 100 by the sheet tape 600, the second prism sheet 530 may be deformed by heat and/or moisture. Thus, a display quality may be deteriorated.

As shown in the exemplary embodiment of FIG. 3, the guiding mold 110 has the securing protrusions 114 adjacent to the sheet-guiding recess 112, to prevent the second prism sheet 530 or other top layer from moving in a horizontal direction.

Furthermore, when the guiding mold 110 has the securing protrusions 114 adjacent to the sheet-guiding recess 112, an efficiency of a manufacturing process may be improved, particularly since the securing protrusion 114 of the guiding mold 110 is aligned with the tape-guiding recess 610 of the sheet tape 600. Thus, when the sheet tape 600 is secured at the guiding mold 110, the sheet tape 600 may be guided by the securing protrusion 114 so that the efficiency of a manufacturing process is improved.

In the aforementioned exemplary embodiments, the guiding mold 110 has two securing protrusions 114 formed adjacent to opposing ends of the sheet-guiding recess 112. Alternatively, the securing protrusion 114 may be formed adjacent to one end of the sheet-guiding recess 112.

The guiding mold 110 may have a plurality of sheet-guiding recesses 112, and the optical sheet 500 may have a plurality of the sheet-guiding portions 504 corresponding to the sheet-guiding recesses 112. The sheet-guiding recesses 112 are disposed between two securing protrusions 114.

In an exemplary embodiment, the sheet-guiding recesses 112 are formed at both sides of the guiding mold 110 to face each other. Alternatively, a plurality of the sheet-guiding recesses 112 may be formed at one side of the guiding mold 110. Thus, a plurality of the sheet-guiding portions 504 corresponding to the sheet-guiding recesses 112 may be formed at one side of the main body 502.

Figure 9:
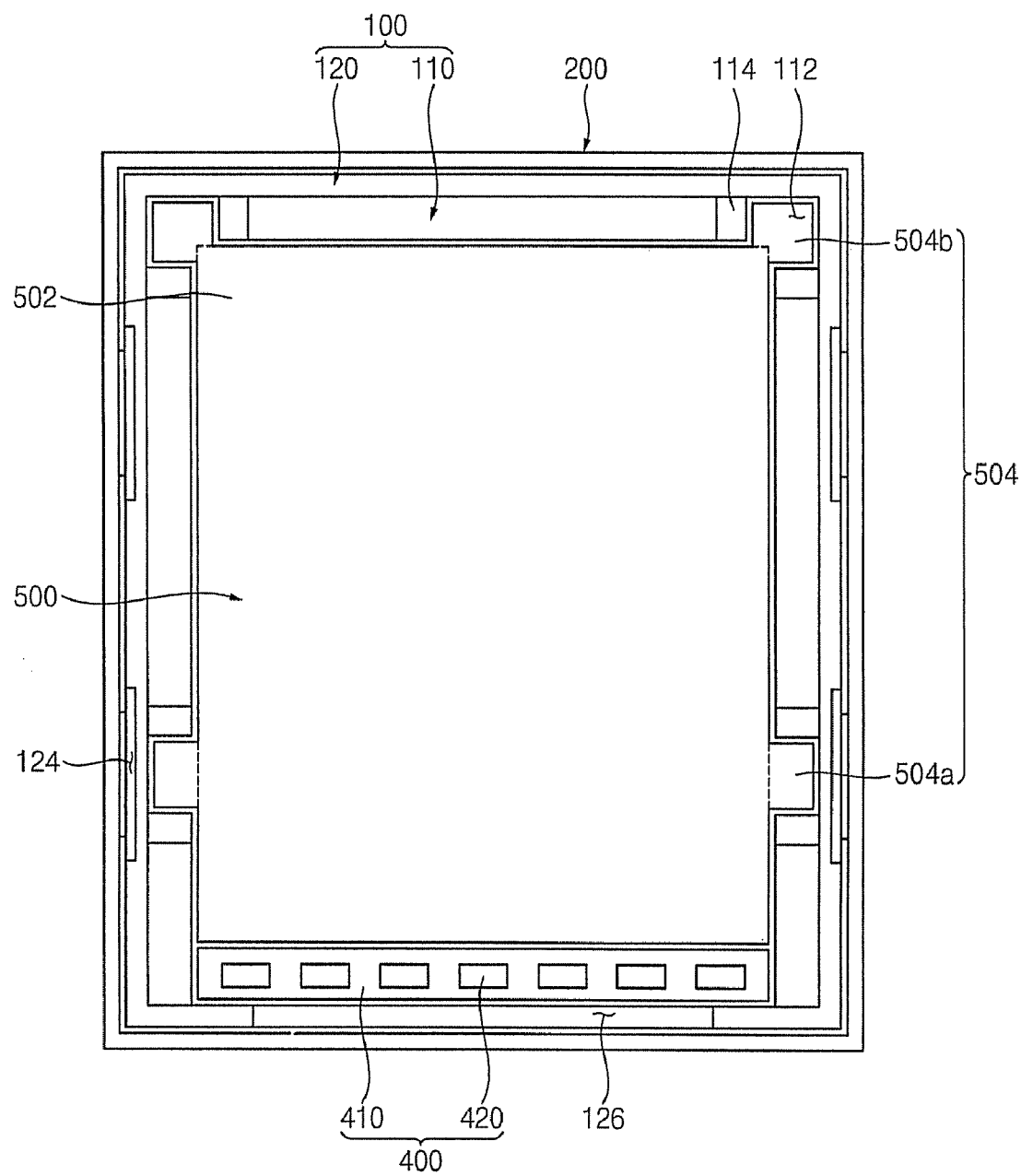
FIG. 9 is a plan view illustrating a backlight assembly of a display apparatus according to still another exemplary embodiment of the present invention.
Figure 10:
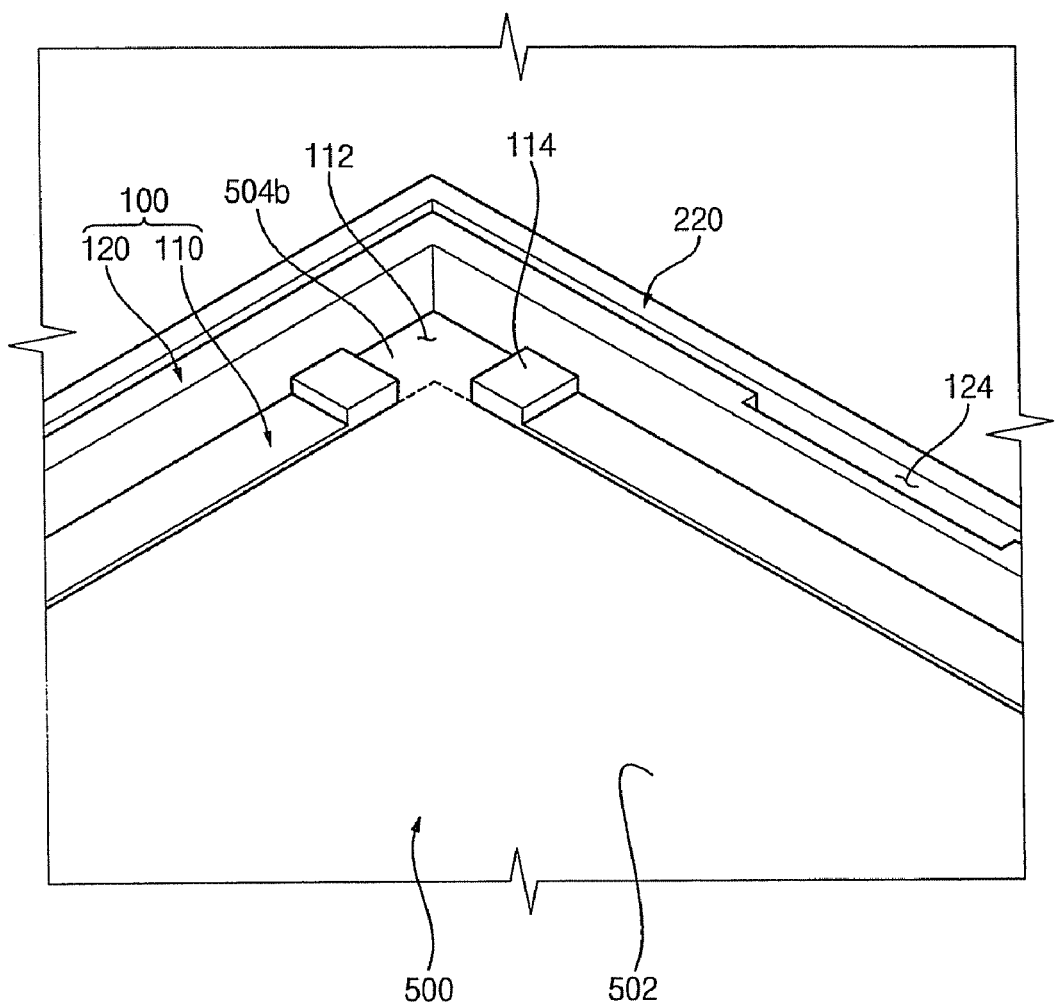
FIG. 10 is an enlarged perspective view illustrating a portion of the backlight assembly shown in FIG. 9.
Figure 11:
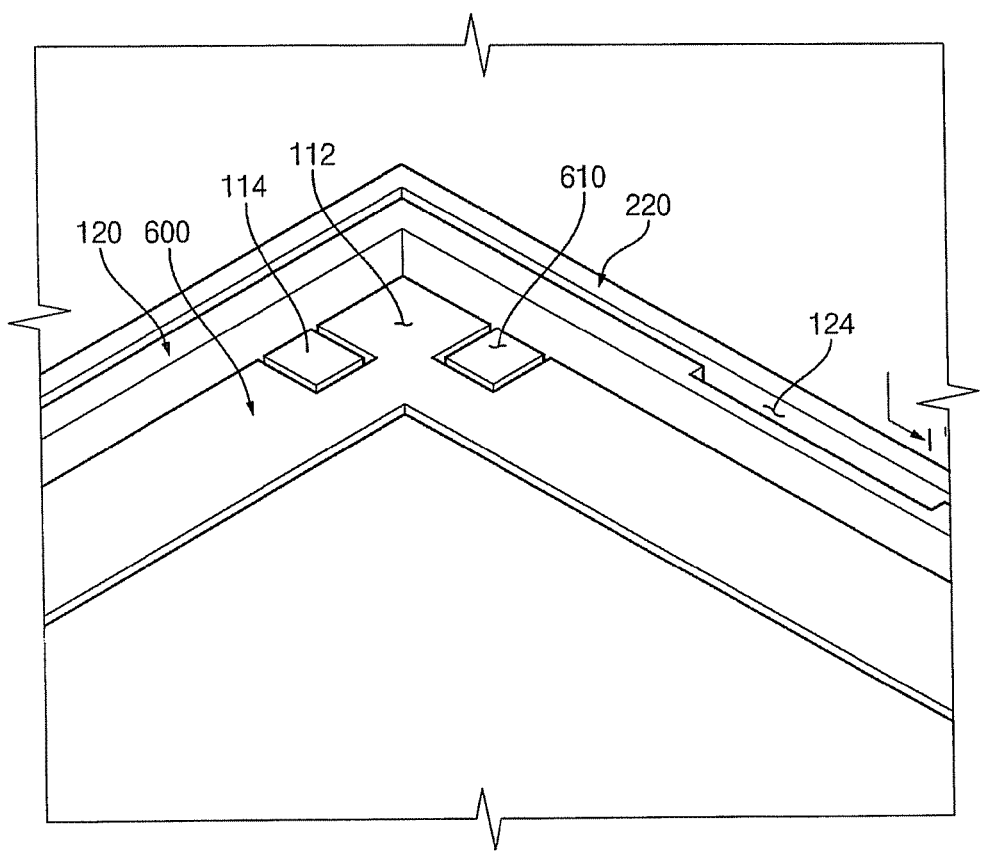
FIG. 11 is a perspective view illustrating the backlight assembly shown in FIG. 9, including a sheet tape.

FIG. 9 is a plan view illustrating a backlight assembly of a display apparatus according to still another exemplary embodiment of the present invention. FIG. 10 is an enlarged perspective view illustrating a portion of the backlight assembly illustrated in FIG. 9. FIG. 11 is a perspective view illustrating the backlight assembly illustrated in FIG. 9, and includes a sheet tape.

The backlight assembly is substantially the same as the backlight assembly illustrated in FIGS. 1 to 6, except for an optical sheet, a guiding mold of a mold frame and a sheet tape. Thus, any further explanation concerning the same elements will be omitted.

Referring to FIGS. 9 to 11, the backlight assembly includes a plurality of optical sheets 500 disposed on the light-guiding plate 300. Each of the optical sheets 500 includes a main body 502 and a sheet-guiding portion 504.

The main body 502 is disposed on the light-guiding plate 300 and is guided by a guiding mold 110. For example, the main body 502 may have a rectangular shape when viewed from a plan view.

The sheet-guiding portion 504 protrudes outward from the main body 502. The sheet-guiding portion 504 may be formed on at least one of four sides of the main body 502 or on at least one of four corners of the main body 502.

For example, the sheet-guiding portion 504 may have a first guiding portion 504a formed at least one of the four sides of the main body 502 and a second guiding portion 504b formed at least one of the four corners of the main body 502.

The first guiding portion 504a may protrude, for example, from each of the longer sides of the main body 502 in a horizontal direction. One side of the first guiding portion 504a may make contact with a side mold 120 of the mold frame 100.

The second guiding portion 504b may protrude outward, for example, from each of the two corners of the main body 502. Two sides of the second guiding portion 504b may make contact with the side mold 120 of the mold frame 100.

The sheet-guiding portion 504 may have the second guiding portion 504b without the first guiding portion 504a.

The guiding mold 110 of the mold frame 100 guides and receives the light-guiding plate 300, a light-generating unit 400 and the optical sheets 500. The guiding mold 110 has a sheet-guiding recess 112 corresponding to the sheet-guiding portion 504, and the sheet-guiding recess 112 receives the sheet-guiding portion 504. Particularly, the sheet-guiding recess 112 receiving the first guiding portion 504a is formed at each two longer sides of the guiding mold 110, and the sheet-guiding recess 112 receiving the second guiding portion 504b is formed at each two corners of the guiding mold 110.

A securing protrusion 114 is adjacent to at least one side of the sheet-guiding recess 112. The securing protrusion 114 protrudes upward from an upper surface of the guiding mold 110. In an exemplary embodiment, two securing protrusions 114 may be respectively adjacent to opposing ends of the sheet-guiding recess 112. The securing protrusion 114 may prevent the sheet-guiding portion 504 received in the sheet-guiding recess 112 from moving in a horizontal direction.

The sheet tape 600 makes contact with an upper surface of a second prism sheet that is a top layer of the optical sheets 500 and with an upper surface of the guiding mold 110 of the mold frame 100 to secure the second prism sheet 530 at the guiding mold 110 of the mold frame 100.

The sheet tape 600 may have a substantially rectangular frame shape when viewed from a plan view. The sheet tape 600 has a tape-guiding recess 610 corresponding to the securing protrusion 114. Particularly, the tape-guiding recess 610 is formed at two longer sides and two corners of the sheet tape 600. The tape-guiding recess 610 receives the securing protrusion 114 and exposes an upper surface of the securing protrusion 114.

An upper surface of the securing protrusion 114 may be disposed in a position higher than that of the second prism sheet 530 that is a top layer of the optical sheets 500, and the upper surface of the second prism sheet 530 may have a height substantially the same as that of the guiding mold 110. The protruding height of the securing protrusion 114 may be equal to or less than a thickness of the sheet tape 600.

According to the above, a securing protrusion is formed adjacent to a sheet-guiding recess of a guiding mold. Thus, an optical sheet may be prevented from moving in a horizontal direction by an external pressure, and misalignment of the optical sheet is prevented, thereby improving a display quality.

Furthermore, the securing portion may be aligned with a tape-guiding recess of a sheet tape so that an efficiency of combining the sheet tape is improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a light providing unit generating light;
   an optical sheet having a main body disposed on the light providing unit and a sheet-guiding portion outwardly protruding from the main body;
   a mold frame having a frame shape to receive the light providing unit and the optical sheet, the mold frame having a sheet-guiding recess and a securing protrusion adjacent to at least one end of the sheet-guiding recess to prevent misalignment of the optical sheet, the sheet-guiding recess receiving the sheet-guiding portion; and
   a sheet tape overlapping at least a portion of the optical sheet and at least a portion of the mold frame to secure the optical sheet to the mold frame;
   wherein the sheet tape has a tape-guiding recess to expose the securing protrusion.

2. The backlight assembly of claim 1, wherein the securing protrusion is formed adjacent to opposing ends of the sheet-guiding recess.

3. The backlight assembly of claim 1, wherein the mold frame comprises:
   a guiding mold receiving the light providing unit and the optical sheet, and having the sheet-guiding recess and the securing protrusion; and
   a side mold extending upward from an edge of the guiding mold.

4. The backlight assembly of claim 1, wherein the sheet tape has a substantially rectangular frame shape when viewed from a plan view.

5. The backlight assembly of claim 1, wherein the securing protrusion is extended upward from an upper surface of the guiding mold.

6. The backlight assembly of claim 5, wherein an upper surface of the securing protrusion is disposed higher than an upper surface of the optical sheet.

7. The backlight assembly of claim 6, wherein a height of the securing protrusion less than or equal to a thickness of the sheet tape.

8. The backlight assembly of claim 7, wherein a height of the upper surface of the optical sheet is substantially the same as a height of the upper surface of the guiding mold.

9. The backlight assembly of claim 7, wherein the height of the securing protrusion is about 80 μm to about 100 μm.

10. The backlight assembly of claim 1, wherein the main body has a substantially rectangular shape when viewed from a plan view, and the sheet-guiding portion is formed on at least one of four sides of the main body.

11. The backlight assembly of claim 10, wherein the optical sheet further comprises an additional sheet-guiding portion, and the sheet-guiding portions are respectively formed at two longer sides of the main body.

12. The backlight assembly of claim 10, wherein the sheet-guiding portion is formed on at least one of four corners of the main body.

13. The backlight assembly of claim 1, wherein the light providing unit comprises:
    a light generating unit generating the light; and
    a light-guiding plate, of which a side surface faces the light generating unit, to guide the light to the optical sheet.

14. The backlight assembly of claim 13, wherein the light generating unit comprises a light-emitting diode generating the light having a point-shape.

15. The backlight assembly of claim 1, further comprising a bottom chassis disposed under the mold frame and combined with the mold frame.

16. A display apparatus comprising:
    a backlight assembly generating light, the backlight assembly having:
        a light providing unit generating light;
        an optical sheet having a main body disposed on the light providing unit and a sheet-guiding portion protruding outward from the main body;
        a mold frame having a frame shape to receive the light providing unit and the optical sheet and having a sheet-guiding recess and a securing protrusion adjacent to at least one end of the sheet-guiding recess to prevent misalignment of the optical sheet, the sheet-guiding recess receiving the sheet-guiding portion; and
        a sheet tape overlapping at least a portion of the optical sheet and at least a portion of the mold frame to secure the optical sheet to the mold frame, wherein the sheet tape has a tape-guiding recess to expose the securing protrusion;
    a display panel disposed on the backlight assembly to display an image.

17. The display apparatus of claim 16, wherein the mold frame comprises:
    a guiding mold receiving the light providing unit and the optical sheet and having the sheet-guiding recess and the securing protrusion; and
    a side mold extending upward from an edge of the guiding mold.

* * * * *